US012423638B2

(12) United States Patent
Nistala et al.

(10) Patent No.: US 12,423,638 B2
(45) Date of Patent: Sep. 23, 2025

(54) METHOD AND SYSTEM FOR GENERATION OF IMPACT ANALYSIS SPECIFICATION DOCUMENT FOR A CHANGE REQUEST

(71) Applicant: Tata Consultancy Services Limited, Mumbai (IN)

(72) Inventors: Padmalata Venkata Nistala, Hyderabad (IN); Asha Sushilkumar Rajbhoj, Pune (IN); Vinay Kulkarni, Pune (IN); Ajim Innus Pathan, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 100 days.

(21) Appl. No.: 18/543,575

(22) Filed: Dec. 18, 2023

(65) Prior Publication Data
US 2024/0386355 A1    Nov. 21, 2024

(30) Foreign Application Priority Data
May 15, 2023   (IN) .............................. 202321034113

(51) Int. Cl.
*G06Q 10/0637*   (2023.01)
*G06F 40/103*    (2020.01)
*G06F 40/289*    (2020.01)

(52) U.S. Cl.
CPC ..... *G06Q 10/06375* (2013.01); *G06F 40/103* (2020.01); *G06F 40/289* (2020.01)

(58) Field of Classification Search
CPC ........... G06Q 10/06375; G06F 40/103; G06F 40/289
See application file for complete search history.

(56) References Cited

U.S. PATENT DOCUMENTS

2005/0193381 A1* 9/2005 Hellerstein ............ G06Q 10/04
   717/151
2010/0153908 A1* 6/2010 Sarkar ................... G06Q 10/06
   717/104

(Continued)

FOREIGN PATENT DOCUMENTS

WO   WO-2020141968 A1 *   7/2020

OTHER PUBLICATIONS

Khan et al. "Impact analysis of keyword extraction using contextual word embedding" (2022) (https://pmc.ncbi.nlm.nih.gov/articles/PMC9202614/pdf/peerj-cs-08-967.pdf) (Year: 2022).*

(Continued)

*Primary Examiner* — Sujay Koneru
(74) *Attorney, Agent, or Firm* — Finnegan, Henderson, Farabow, Garrett & Dunner, LLP

(57) ABSTRACT

This disclosure relates generally to impact analysis and, more particularly, to generation of impact analysis specification document for a change request. The existing state-of-art techniques for impact analysis for a change request are mostly manual, and further most of the research on impact analysis is based on source code analysis and does not address the impact of the CR at multi-granular levels. The disclosed techniques perform a fine-grained impact analysis of the CR at multi-granular levels. The fine-grained impact analysis at multi-granular includes identifying a set of impacted specification elements, a set of impacted processes, and a set of impacted features based on several steps including generating a contextual specification model and extracting a plurality of key-phrases.

15 Claims, 13 Drawing Sheets

(56) References Cited

U.S. PATENT DOCUMENTS

| | | | |
|---|---|---|---|
| 2015/0067635 A1* | 3/2015 | Chen | G06Q 10/06 |
| | | | 717/102 |
| 2015/0142419 A1* | 5/2015 | Edwards | G06F 40/284 |
| | | | 704/9 |
| 2016/0224996 A1* | 8/2016 | Hunt | G06F 16/283 |
| 2018/0089242 A1* | 3/2018 | Lev | G06F 16/2228 |
| 2019/0050771 A1* | 2/2019 | Meharwade | G06Q 10/067 |
| 2019/0095526 A1* | 3/2019 | Adwait | G06F 16/3344 |
| 2019/0213354 A1* | 7/2019 | Bhowan | G06N 20/00 |
| 2020/0311603 A1* | 10/2020 | Qiu | G06F 11/3452 |
| 2021/0117670 A1* | 4/2021 | Manchanda | G06F 40/226 |

OTHER PUBLICATIONS

Jalaja, T. et al., "Automation Of Impact Analysis", Title of the item: International Journal of New Innovations in Engineering and Technology, Date: 2019, vol. 11; Issue: 4, Link: http://www.ijniet.org/wp-content/uploads/2019/10/3.pdf.

Jalaja, T. et al., "Automation of Change Impact Analysis for Python Applications", Title of the item: Smart Innovation, Systems and Technologies, Date: 2021, vol. 224, Publisher: Springer Book Series, Link: https://www.researchgate.net/profile/Dr-Thankachan/publication/363172689_Springer_Book_Series/links/63104c7161e4563b955663d5/Springer-Book-Series.pdf#page=267.

Iwasaki, Haruya et al., "A Software Impact Analysis Tool based on Change History Learning and its Evaluation", Title of the item: IEEE/ACM 44th International Conference on Software Engineering: Software Engineering in Practice (ICSE-SEIP), Date: 2022, Publisher: IEEE, Link: https://dl.acm.org/doi/pdf/10.1145/3510457.3519017.

* cited by examiner

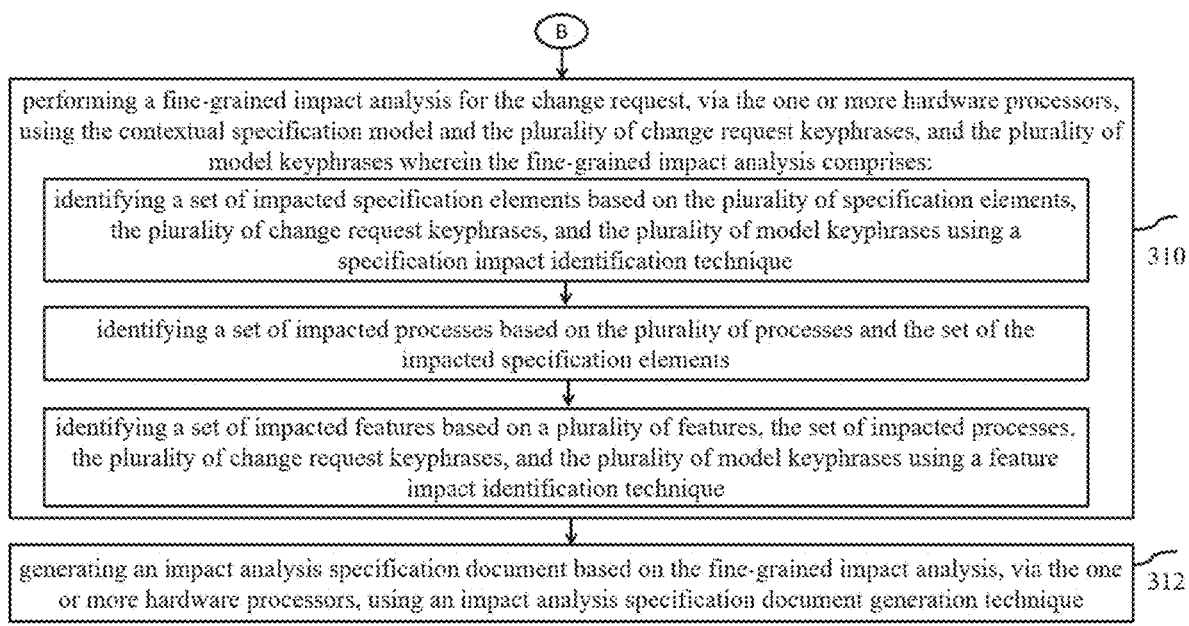

CR Change Title: A new account category-Equity savings account to be introduced

Change Description:
Currently the individuals can have "ordinary" book-entry accounts or "Long-Term Savings" Accounts of which the latter is exempted from tax. We need to be able to distinguish between ordinary book-entry accounts and the exempted ones. In addition to the "ordinary" accounts and the "Long-term savings" account, an additional "Equities Savings" account is to be introduced. There is a requirement to distinguish this account type from the two others.

Change Context: ABC Corporation

1 Introduction

1.1 Scope of Document

This document describes the change in the business functions due to the impact of the Change Request CR-201 A new account category - Equities savings account to be introduced

1.2 Change Request CR-201

CR Title: A new account category - Equities savings account to be introduced

CR Description: Currently the individuals can have "ordinary" book-entry accounts or so called Long Term Savings Accounts (LTSA being book-entry accounts) .................................

2 Impact Summary

The following is the summary of impacted features due to the Change Request :

| Feature Area | Feature | Context | Feature Type | Remarks |
|---|---|---|---|---|
| Accounts | CA007 - Create and Maintain Accounts ABC | CORE | IO Function | Specification impact -activity |
| Accounts | CA007 - Create and Maintain Accounts | ABC | IO Function | Specification impact |
| Accounts | CDA014 - Whole Account Transfer | CORE | IO Function | |
| Accounts | INTCA01 - Account Opening Instruction | CORE | Interface | |
| Accounts | INTCA02 - Account Details Confirmation | CORE | Interface | |
| Accounts | INTCA03 - Account Modification Instruction | CORE | Interface | |
| Accounts | RPTCA008 - Account Transfer (Requesting CP) | CORE | Report | |
| Transfers | TR014 - Whole Account Transfer | CORE | IO Function | Dependency on impacted feature |

3 Impact on Features

3.1 Create and Maintain Accounts (CA007)

3.1.1 Impacted Attributes

| ParamSet | Parameter Name | Data Format | Description |
|---|---|---|---|
| Create and Maintain Accounts | A/c Category | List of Values | Possible Values for participant accounts are<br>• General<br>• Segregated<br>• Collateral<br>Possible values for internal accounts are<br>• Entitlement<br>• Fractions<br>• Nostro |

4 Impact on Interfaces

..........................

5 Impact on Reports

METHOD AND SYSTEM FOR GENERATION OF IMPACT ANALYSIS SPECIFICATION DOCUMENT FOR A CHANGE REQUEST

PRIORITY CLAIM

This U.S. patent application claims priority under 35 U.S.C. § 119 to: India Application No. 202321034113, filed on May 15, 2023. The entire contents of the aforementioned application are incorporated herein by reference.

TECHNICAL FIELD

The disclosure herein generally relates to impact analysis and, more particularly, to generation of impact analysis specification document for a change request.

BACKGROUND

Products evolve over a period to adopt to specific business needs of a client, a market, regulatory requirements etc., The changes to requirements during the evolution of the product are documented as a Change requests (CR) for enhancements to a product or system. It is essential to identify, analyze, document, monitor, and control a change request during a product/project management, for increasing the product/project's success rate as the change requests may impact a project's scope, budget, resource requirements, and timeline thus impacting the revenue/business. The ability to analyze CRs and determine the CR's impact on the existing functionality is a necessary capability of the requirement experts. Most often, the task of CR impact analysis requires deep understanding of the product, its functionality, interfaces, and dependencies and so on.

The existing state-of-art techniques for impact analysis for a change request are manual, wherein the requirement experts refer to the existing product documentation in various requirement specification documents to cross-check their understanding and dependencies, and manually prepare an impact analysis document, which is a cumbersome and error prone activity. Further, most of the research on impact analysis is based on source code analysis and does not address the impact of the CR at a requirement specification level. Primarily the responsibility of CR impact analysis lies with a requirement expert who works at requirement specification level while the existing techniques work at source code level, thus the existing techniques do not result in any value add to the requirement experts. Hence there is a need for techniques to automatically perform the impact analysis of CR s at requirement specification level with minimal manual intervention.

SUMMARY

Embodiments of the present disclosure present technological improvements as solutions to one or more of the above-mentioned technical problems recognized by the inventors in conventional systems. For example, in one embodiment, a method for generation of impact analysis specification document for a change request is provided.

The system includes a memory storing instructions, one or more communication interfaces, and one or more hardware processors coupled to the memory via the one or more communication interfaces, wherein the one or more hardware processors are configured by the instructions to receive a plurality of inputs from a plurality of sources, via one or more hardware processors, wherein the plurality of inputs is associated with a change request and the plurality of inputs comprises: a change request, where the change request comprises a change title, a change description and a change context, wherein the change context is at least one of a client, a market and a geography in which the change request is to be implemented, and a plurality of natural language requirement specification documents. The system is further configured to pre-process the change request to obtain a processed change request based on a set of pre-processing techniques, via the one or more hardware processors, wherein the processed change request comprises a processed change title, a processed change description and a processed change context. The system is further configured to generate a contextual specification model, via the one or more hardware processors, based on the plurality of natural language requirement specification documents and the processed change context, using a model generation technique, wherein the contextual specification model comprises: the plurality of features, where the plurality of features is decomposed into multiple levels as per a feature hierarchy and each of the plurality of features is associated with a plurality of feature types, a plurality of feature dependency associations, and a plurality of feature extensions corresponding to the change context; a plurality of processes corresponding to the plurality of features, and a plurality of specification elements corresponding to the plurality of processes, wherein the plurality of specification elements comprises a plurality of activities, a plurality of rulesets, a plurality of rules and a plurality of parameters. The system is further configured to extract a plurality of keyphrases using a set of keyphrase extraction techniques, via the one or more hardware processors, based on the processed change title, the processed change description, and contextual specification model wherein the plurality of keyphrases comprises a plurality of change request keyphrases and a plurality of model keyphrases. The system is further configured to perform a fine-grained impact analysis for the change request, via the one or more hardware processors, using the contextual specification model and the plurality of change request keyphrases, and the plurality of model keyphrases wherein the fine-grained impact analysis comprises: identifying a set of impacted specification elements based on the plurality of specification elements, the plurality of change request keyphrases, and the plurality of model keyphrases using a specification impact identification technique, identifying a set of impacted processes based on the plurality of processes and the set of the impacted specification elements. The system is further configured to identify a set of impacted features based on a plurality of features, the set of impacted processes, the plurality of change request keyphrases, and the plurality of model keyphrases using a feature impact identification technique. The system is further configured to generate an impact analysis specification document based on the fine-grained impact analysis, via the one or more hardware processors, using an impact analysis specification document generation technique.

In another aspect, a method for generation of impact analysis specification document for a change request is provided. The method includes receiving a plurality of inputs from a plurality of sources, wherein the plurality of inputs is associated with a change request and the plurality of inputs comprises: a change request, where the change request comprises a change title, a change description and a change context, wherein the change context is at least one of a client, a market and a geography in which the change request is to be implemented, and a plurality of natural language requirement specification documents. The method includes pre-processing the change request to obtain a processed change request based on a set of pre-processing techniques, wherein the processed change request comprises a processed change title, a processed change description and a processed change context. The method includes generating a contextual specification model, based on the plurality of natural language requirement specification documents and the processed change context, using a model generation technique, wherein the contextual specification model comprises: the plurality of features, where the plurality of features is decomposed into multiple levels as per a feature hierarchy and each of the plurality of features is associated with a plurality of feature types, a plurality of feature dependency associations, and a plurality of feature extensions corresponding to the change context; a plurality of processes corresponding to the plurality of features, and a plurality of specification elements corresponding to the plurality of processes, wherein the plurality of specification elements comprises a plurality of activities, a plurality of rulesets, a plurality of rules and a plurality of parameters. The method includes extracting a plurality of keyphrases using a set of keyphrase extraction techniques, based on the processed change title, the processed change description, and contextual specification model wherein the plurality of keyphrases comprises a plurality of change request keyphrases and a plurality of model keyphrases. The method includes performing a fine-grained impact analysis for the change request, using the contextual specification model and the plurality of change request keyphrases, and the plurality of model keyphrases wherein the fine-grained impact analysis comprises: identifying a set of impacted specification elements based on the plurality of specification elements, the plurality of change request keyphrases, and the plurality of model keyphrases using a specification impact identification technique, identifying a set of impacted processes based on the plurality of processes and the set of the impacted specification elements. The method includes identification of a set of impacted features based on a plurality of features, the set of impacted processes, the plurality of change request keyphrases, and the plurality of model keyphrases using a feature impact identification technique. The method includes generating an impact analysis specification document based on the fine-grained impact analysis, via the one or more hardware processors, using an impact analysis specification document generation technique.

In yet another aspect, a non-transitory computer readable medium for generation of impact analysis specification document for a change request is provided. The method includes receiving a plurality of inputs from a plurality of sources, wherein the plurality of inputs is associated with a change request and the plurality of inputs comprises: a change request, where the change request comprises a change title, a change description and a change context, wherein the change context is at least one of a client, a market and a geography in which the change request is to be implemented, and a plurality of natural language requirement specification documents. The method includes pre-processing the change request to obtain a processed change request based on a set of pre-processing techniques, wherein the processed change request comprises a processed change title, a processed change description and a processed change context. The method includes generating a contextual specification model, based on the plurality of natural language requirement specification documents and the processed change context, using a model generation technique, wherein the contextual specification model comprises: the plurality of features, where the plurality of features is decomposed into multiple levels as per a feature hierarchy and each of the plurality of features is associated with a plurality of feature types, a plurality of feature dependency associations, and a plurality of feature extensions corresponding to the change context; a plurality of processes corresponding to the plurality of features, and a plurality of specification elements corresponding to the plurality of processes, wherein the plurality of specification elements comprises a plurality of activities, a plurality of rulesets, a plurality of rules and a plurality of parameters. The method includes extracting a plurality of keyphrases using a set of keyphrase extraction techniques, based on the processed change title, the processed change description, and contextual specification model wherein the plurality of keyphrases comprises a plurality of change request keyphrases and a plurality of model keyphrases. The method includes performing a fine-grained impact analysis for the change request, using the contextual specification model and the plurality of change request keyphrases, and the plurality of model keyphrases wherein the fine-grained impact analysis comprises: identifying a set of impacted specification elements based on the plurality of specification elements, the plurality of change request keyphrases, and the plurality of model keyphrases using a specification impact identification technique, identifying a set of impacted processes based on the plurality of processes and the set of the impacted specification elements. The method includes identification of a set of impacted features based on a plurality of features, the set of impacted processes, the plurality of change request keyphrases, and the plurality of model keyphrases using a feature impact identification technique. The method includes generating an impact analysis specification document based on the fine-grained impact analysis, via the one or more hardware processors, using an impact analysis specification document generation technique.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 3A to FIG. 3C is a flow diagram illustrating a method (300) for generation of impact analysis specification document for a change request in accordance with some embodiments of the present disclosure.

FIG. 4 illustrates a sample change request (CR) to be analyzed during the generation of impact analysis specification document in accordance with some embodiments of the present disclosure.

FIG. 10 is an example implementation depicting the input change request along with a plurality of keyphrases, and set of impacted features, a set of impacted ruleset, a set of impact parameters generated during generation of the impact analysis specification document.

FIG. 11 illustrates a partial view of impact analysis specification document generated for a change request in accordance with some embodiments of the present disclosure.

DETAILED DESCRIPTION

Figure 1:
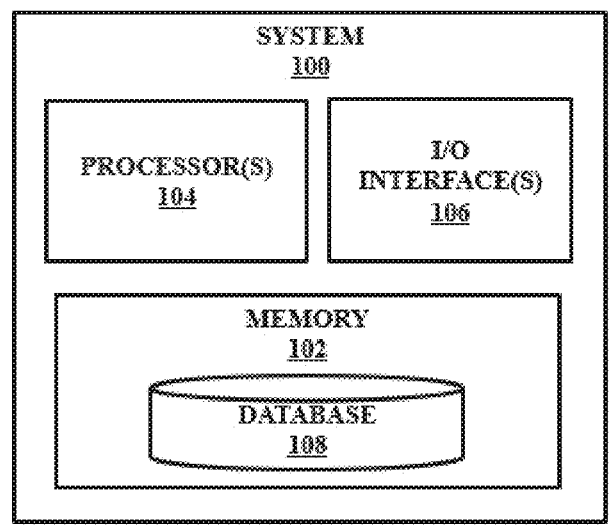
FIG. 1 illustrates an exemplary system for generation of impact analysis specification document for a change request according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Referring now to the drawings, and more particularly to FIG. 1 through FIG. 11, where similar reference characters denote corresponding features consistently throughout the figures, there are shown preferred embodiments and these embodiments are described in the context of the following exemplary system and/or method.

FIG. 1 is an exemplary block diagram of a system 100 generation of impact analysis specification document for a change request in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of the system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 is configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, a network cloud and the like.

The I/O interface(s) 106 can include a variety of software and hardware interfaces, for example, a web interface, a graphical user interface, a touch user interface (TUI) and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the system 100 to one another or to another server.

The memory 102 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

Further, the memory 102 may include a database 108 configured to include information regarding generation of impact analysis specification document for a change request. The memory 102 may comprise information pertaining to input(s)/output(s) of each step performed by the processor(s) 104 of the system 100 and methods of the present disclosure. In an embodiment, the database 108 may be external (not shown) to the system 100 and coupled to the system via the I/O interface 106.

Figure 2:
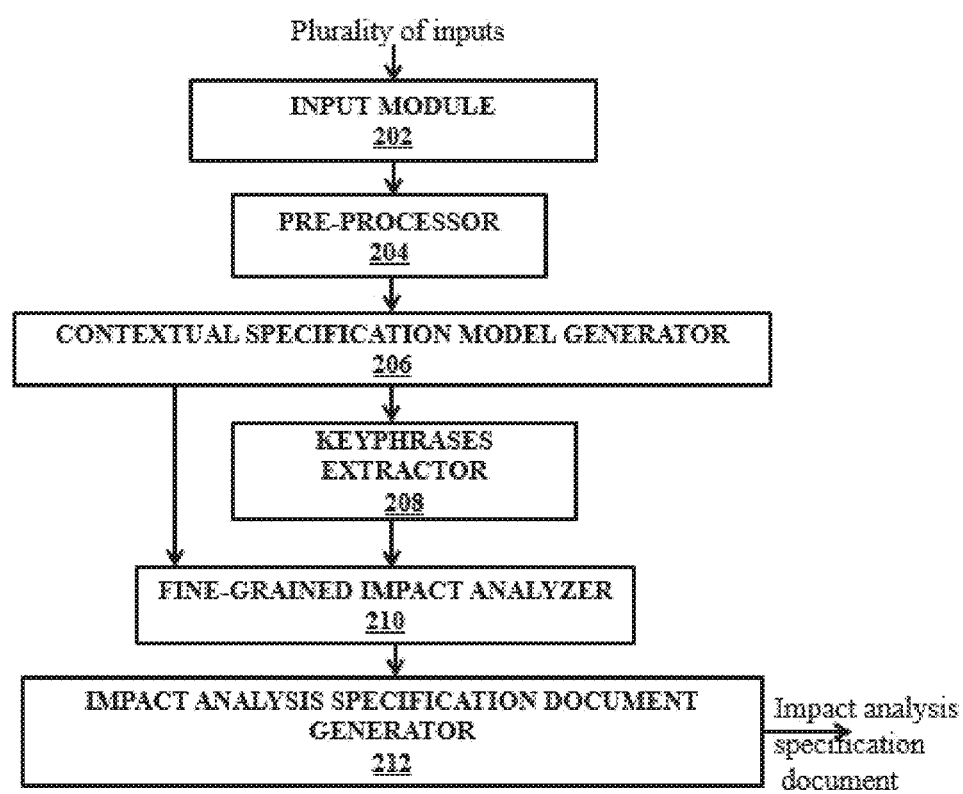
FIG. 2 is a functional block diagram for generation of impact analysis specification document for a change request according to some embodiments of the present disclosure.
Figure 3A:
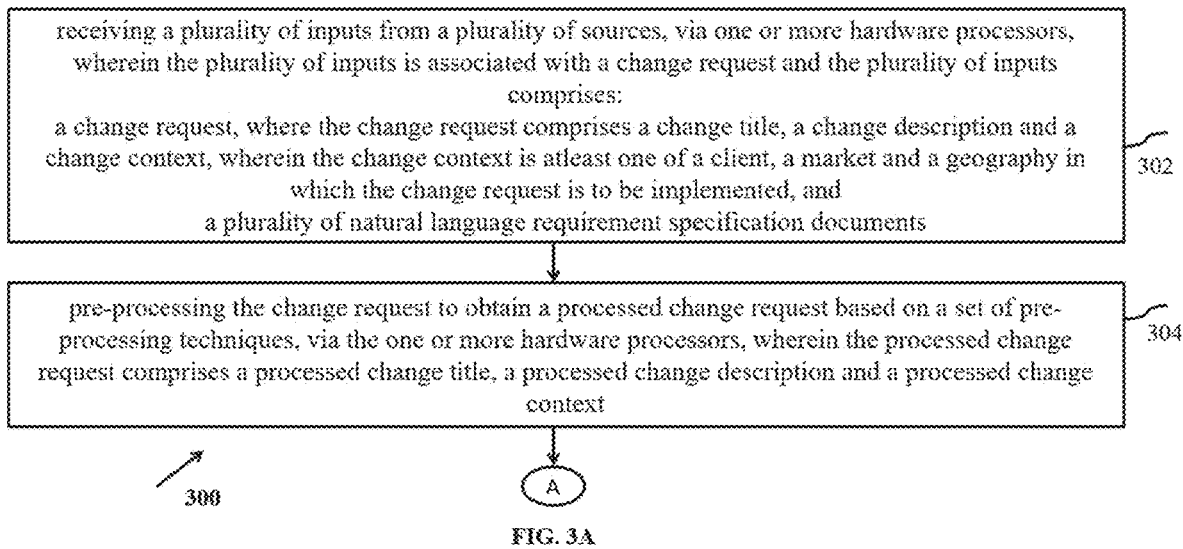
Figure 3B:
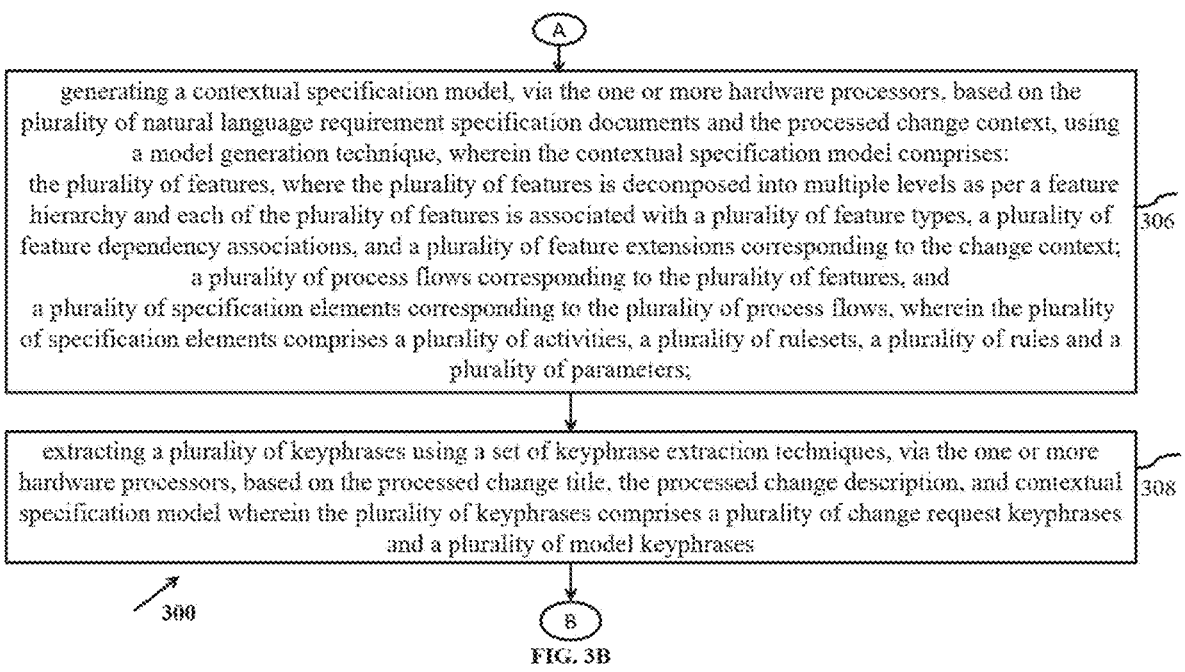

Functions of the components of system 100 are explained in conjunction with functional overview of the system 100 in FIG. 2 and flow diagram of FIG. 3A to FIG. 3C for generation of impact analysis specification document for a change request.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

FIG. 2 is an example functional block diagram of the various modules of the system of FIG. 1, in accordance with some embodiments of the present disclosure. As depicted in the architecture, the FIG. 2 illustrates the functions of the modules of the system 100 that includes generation of impact analysis specification document for a change request.

As depicted in FIG. 2, the functional system 200 of system 100 system 200 is configured for generation of impact analysis specification document for a change request.

The system 200 comprises input module 202 configured for receiving a plurality of inputs from a plurality of sources, wherein the plurality of inputs is associated with a change request and the plurality of natural language requirement specification documents. The system 200 further comprises a pre-processor 204 configured for pre-processing the change request to obtain a processed change request based on a set of pre-processing techniques, title, a processed change description and a processed change context. The system 200 further comprises a contextual specification model generator 206 configured for generating a contextual specification model based on the plurality of natural language requirement specification documents and the processed change context using a model generation technique. The system 200 further comprises a keyphrases extractor 208 configured for extracting a plurality of keyphrases using a set of keyphrase extraction techniques, wherein the plurality of keyphrases comprises a plurality of change request keyphrases and a plurality of model keyphrases. The system 200 further comprises a fine-grained impact analyzer 210 configured for performing a fine-grained impact analysis for the change request using the contextual specification model and a plurality of change request keyphrases, and a plurality of model keyphrases. The system 200 further comprises an impact analysis specification document generator 212 configured for generating an impact analysis specification document based on the fine-grained impact analysis, via the one or more hardware processors, using an impact analysis specification document generation technique.

The various modules of the system 100 and the functional blocks in FIG. 2 are configured for generation of impact analysis specification document for a change request are implemented as at least one of a logically self-contained part of a software program, a self-contained hardware component, and/or, a self-contained hardware component with a logically self-contained part of a software program embedded into each of the hardware component that when executed perform the above method described herein.

Functions of the components of the system 200 are explained in conjunction with functional modules of the system 100 stored in the memory 102 and further explained in conjunction with flow diagram of FIGS. 3A-3C. The FIGS. 3A-3C with reference to FIG. 1, is an exemplary flow diagram illustrating a method 300 for generation of impact analysis specification document for a change request using the system 100 of FIG. 1 according to an embodiment of the present disclosure.

The steps of the method of the present disclosure will now be explained with reference to the components of the system 100 of FIG. 1 for generation of impact analysis specification document for a change request and the modules 202-214 as depicted in FIG. 2 and the flow diagrams as depicted in FIGS. 3A-3C. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 302 of the method 300, a plurality of inputs is received from a plurality of sources by the input module 202. The plurality of inputs is associated with a change request. The plurality of inputs comprises:
(a) a change request, where the change request comprises a change title, a change description and a change context, wherein the change context is at least one of a client, a market and a geography in which the change request is to be implemented, and
(b) a plurality of natural language requirement specification documents.

In an embodiment, the CR that is provided as a natural language (NL) text along with CR context that is specified in terms of the client/market/geography in which the CR is applicable. An example of a CR has been illustrated in FIG. 4, wherein the CR comprises a CR change title, a change description and a change context and corresponding data for each of the CR change Title, the change description and the change context.

At step 304 of the method 300, the change request is pre-processed to obtain a processed change request based on a set of pre-processing techniques in the pre-processor 204. The processed change request comprises a processed change title, a processed change description and a processed change context.

In an embodiment, the set of pre-processing techniques is performed using a domain dictionary and includes at least one of a technique for removal of a plurality of stop words, a root word formation technique, a technique for swapping dictionary terms with corresponding common names.

At step 306 of the method 300, a contextual specification model is generated in the contextual specification model identifier 206. The contextual specification model is generated based on the plurality of natural language requirement specification documents and the processed change context using a model generation technique.

In an embodiment, the contextual specification model comprises:
(a) the plurality of features, where the plurality of features is decomposed into multiple levels as per a feature hierarchy and each of the plurality of features is associated with a plurality of feature types, a plurality of feature dependency associations, and a plurality of feature extensions corresponding to the change context;
(b) a plurality of processes corresponding to the plurality of features, and
(c) a plurality of specification elements corresponding to the plurality of processes, wherein the plurality of specification elements comprises a plurality of activities, a plurality of rulesets, a plurality of rules and a plurality of parameters.

In an embodiment, the model generation technique comprises a natural language processing (NLP) technique. The model generation technique comprises several steps including extracting a plurality of text content from the plurality of requirement specification documents using a document engine parsing technique. The extracted plurality of text content is used for generating a plurality of models using NLP based text processing techniques comprising a Parts of Speech (POS) tagging technique, a Stemming technique, a Tokenization technique, text matching techniques.

Figure 5:
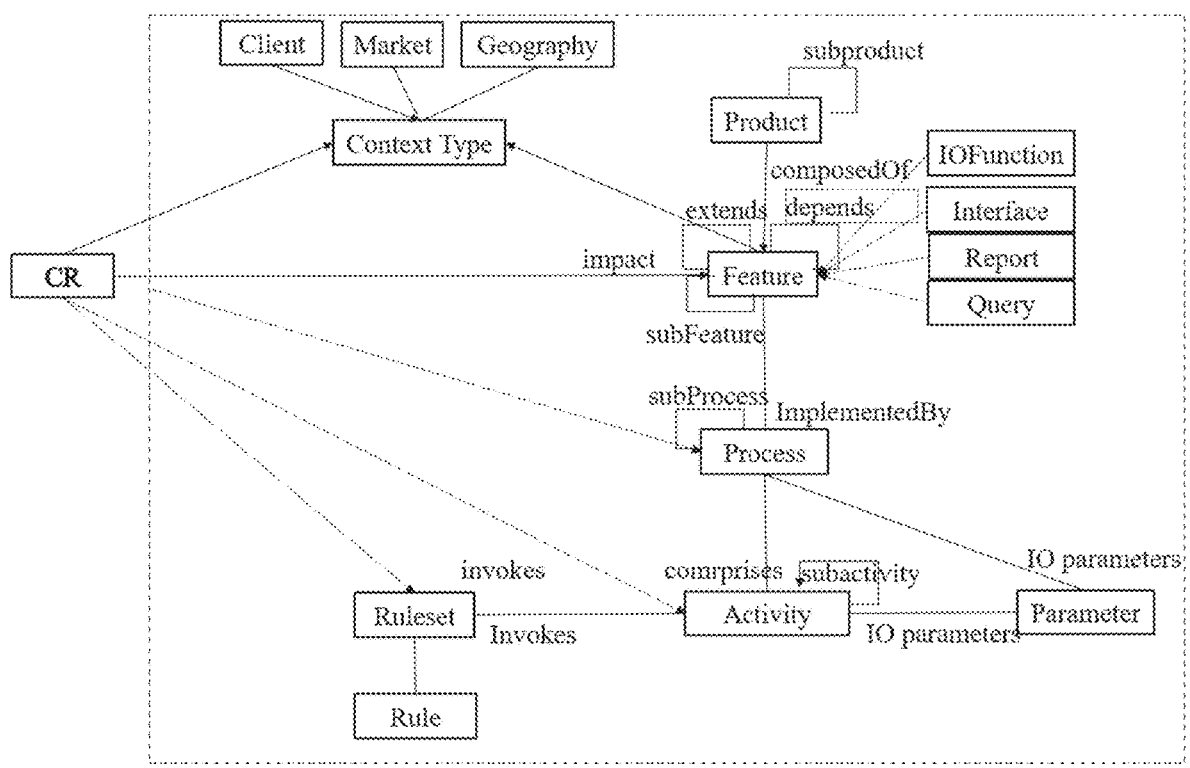
FIG. 5 illustrates a contextual specification model generated during the generation of impact analysis specification document for a change request in accordance with some embodiments of the present disclosure.

In an embodiment, an example scenario of a contextual specification model is illustrated in the FIG. 5, wherein the plurality of features, the plurality of processes and the plurality of specification elements are illustrated along with the corresponding associations.

As illustrated in FIG. 5 the contextual specification model outlines a comprehensive picture of a product and the associated plurality of features, the plurality of processes, the plurality of specifications, the change requests, and their associated context. A Product can have multiple sub products and is composedOf one or more plurality of features. A feature within the plurality of features can decompose into subfeatures. A feature may have depends association on one or more features for its functionality. A feature is of a specific FeatureType, wheresome of the Predefined feature types can be—an I/O Function (Input-output function), a query, a report and an interface etc. Depending on the feature type, the associated feature properties will change. In an example scenario, an features of interface feature type include properties on a source system, a target system, direction, schedule, a field specifications etc. Similarly, features of report feature type will have frequency of distribution, fileformat, language, schedule etc. A feature also has an associated ContextType that determines whether the particular feature is applicable in an implementation. The Context types comprise a Client, a Geography, a Market etc. In an example scenario, a rule or a regulation or a tax calculation will differ based on the geography/market, and will need to be accordingly considered. A feature can be extended for a specific context.

Each Feature is implemented by a process. The process may have multiple subprocesses. The process can be described in terms of one or many activities as a plurality of activities. The activities can be further decomposed in sub-activities. A process/an activity can invoke a ruleset from a a plurality of rulesets. A ruleset depicts the logical grouping of rules and may comprise a plurality of rules. A process and an activity may use multiple I/O parameters. A change request is described by various properties—change title, change description, change context, and so on. A change request is applicable in a specific context and has impact on features. The term model element refers to any element in this contextual specification model.

Figure 6:
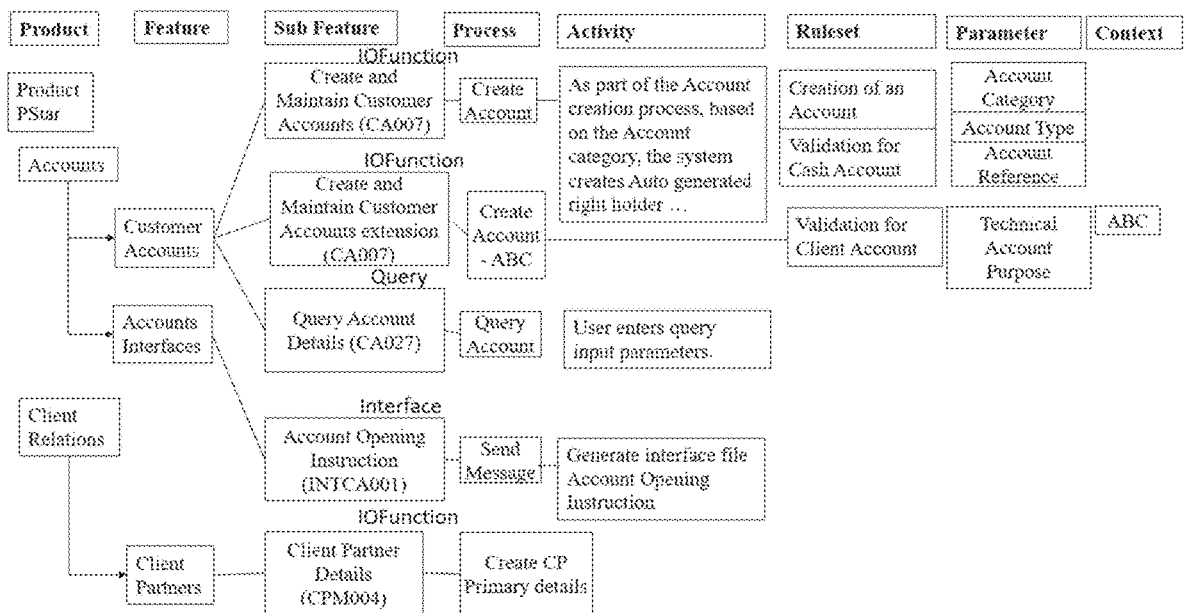
FIG. 6 illustrates a contextual specification model with example data generated during the generation of impact analysis specification document for a change request in accordance with some embodiments of the present disclosure.

Another example scenario of the contextual contextual specification model is illustrated using the FIG. 6, with example scenarios of the plurality of features, the plurality of processes, and the plurality of specification elements along with the corresponding associations for a product Pstar. The product comprises a plurality of features and sub features, a plurality of activities, a plurality of rulesets, a plurality of rules and a plurality of parameters, as illustrated in the FIG. 6 for the product "PStar":

The plurality of features of PStar includes: "Accounts" and "Client relations":
the feature "Accounts" decomposes into sub-features including "Customer accounts" and "Account interfaces". The feature "Client relations" feature decomposes into "Client partners" that comprises a sub-feature "Client Partner Details (CPM004)", and a process of "Create CP Primary details".

Further to enable better understanding of the intricacies of the contextual specification model—the feature "Customer accounts" is explained in elaborate detail in this section with examples for the plurality of processes, plurality of activities, the plurality of rulesets, the plurality of rules and the plurality of parameters: The Customer accounts feature is decomposed into sub features (a) Create and Maintain Customer Accounts (CA007), (b) Create and Maintain Customer Accounts extension (CA007) and (c) Query Account Details (CA027). The feature type corresponding to the feature is marked as "IO Function", "Interface" etc. For example, "Create and Maintain Customer Accounts (CA007)" is of feature type "IO Function" and Query account details (CA027) is of feature type "Query", The further decomposition of the each of the feature into contextual specification model is captured below:

(a) Create and Maintain Customer Accounts (CA007):
  Process: "Create Account" is one of the plurality of processes for the above feature.
  Activity: One of the plurality of activities for process "Create Account" is "As part of the Account creation process, based on the Account category, the system creates Auto generated right holder . . . "
  Rulesets: Two of the plurality of rulesets for process "Create Account" are "Creation of an Account" & "Validation for Cash Account"
  Parameters: A few of the plurality of parameters for process "Create Account" are "Account Category", "Account Type" & "Account Reference"
  Context: No context is associated to Create and Maintain Customer Accounts (CA007)

(b) Create and Maintain Customer Accounts extension (CA007): This feature is a specific feature extension for client ABC.
  Process: "Create Account—ABC" is one of the plurality of processes for the above feature.
  Activity: No activity is associated to Create and Maintain Customer extension (CA007).
  Rulesets: One of the plurality of rulesets for process "Create Account ABC" is "Validation for Client Account".
  Parameters: One of the plurality of parameters for process "Create Account ABC" are "Technical Account Purpose".
  Context: The context of the feature is marked as Client "ABC" as this feature is a specific feature extension for client ABC.

(c) Query Account Details (CA027)
  Process: "Query Account" is one of the plurality of processes for the above feature.
  Activity: One of the plurality of activities for process "Create Account" is "User enters query input parameters".
  The Query Account Details (CA027) has no Rulesets, Parameters or Context.

At step 308 of the method 300, a plurality of keyphrases is extracted using a set of keyphrase extraction techniques in the keyphrases extractor 208. The plurality of keyphrases comprises a plurality of change request keyphrases and a plurality of model keyphrases.

The plurality of change request keyphrases is extracted based on the processed change title and the processed change description.

The plurality of model keyphrases comprises a set of keyphrases corresponding to each feature from the plurality of features and each specification element from the plurality of specification elements.

In an embodiment, the keyphrases extraction technique comprises of a Natural language processing (NLP) based techniques including a term frequency-inverse document frequency (TF-IDF) technique, a Rapid Automatic Keyword Extraction (RAKE) technique and a pattern-chunking technique.

In an embodiment, considering an example scenario of the pattern-chunking technique to perform extraction. The terms "plurality of change request keyphrases" and "plurality of model keyphrase" are referred to as "keyphrases" while explaining the pattern-chunking technique. the pattern-chunking method comprises identifying keyword using tokenization, parts of speech (PoS) tagging, text conversion to root form, excluding stop words, and extracting keyphrases from a text element wherein a text element can be a CR or a feature, or a process, or a specification element, or a context type. The identified keyphrases are refined using a TF-IDF scoring method in which term t is a keyphrase, document d is a text element (feature/process/specification/CR), and term frequency, tf is number of instances of a key phrase in a subject element, and document frequency df(t) is number of subject elements containing the key phrase t. Inverse document frequency, idf for each keyphrase is computed as per standard formulae $idf(t)=\log(N/df(t))$. Each subject element and the corresponding generated key phrases are identified and stored in a csv (comma-separated values) file.

An example scenario is illustrated for the keyphrases extraction using the Table. 1 for text elements—CR and rule:

TABLE 1

| Text Element | Text (Name and description) | Keyphrases |
|---|---|---|
| CR | Currently the individuals can have "ordinary" book-entry accounts or "Long-Term Savings" Accounts of which the latter is exempted from tax. We need to be able to distinguish between ordinary book-entry accounts and the exempted ones. In addition to the "ordinary" accounts and the "Long-term savings" account, an additional "Equities Savings" account is to be introduced. There is a requirement to distinguish this account type from the two others. | Long term saving account, ordinary book entry account, account type, account category, equity savings account |
| Rule | If the account category is set up as 'Joint owner' account, then Right holder for Joint account needs to be registered mandatorily for activation of the account. There must be only one Entitlement security Account across the system | account category, joint owner, right holder, joint account, entitlement security account |
| Activity | As part of the Account creation process, based on the Account category, the system creates Auto generated right holder (Basic rights) with new reference and new time stamp and sends a proprietary message to the Receiving DP. The System will show the Original timestamps and Original reference numbers. | account creation process, account category, right holder, basic right, proprietary message |

At step 310 of the method 300, a fine-grained impact analysis is performed for the change request in the fine-grained impact analyser 214. The fine-grained impact analysis is performed using the contextual specification model and the plurality of change request keyphrases, and the plurality of model keyphrases.

The fine-grained impact analysis comprises the following steps:

(a) identifying a set of impacted specification elements based on the plurality of specification elements, the plurality of change request keyphrases, and the plurality of model keyphrases using a specification impact identification technique;

(b) identifying a set of impacted processes based on the plurality of processes and the set of the impacted specification elements; and (c) identifying a set of impacted features based on a plurality of features, the set of impacted processes, the plurality of change request keyphrases, and the plurality of model keyphrases using a feature impact identification technique.

Figure 7:
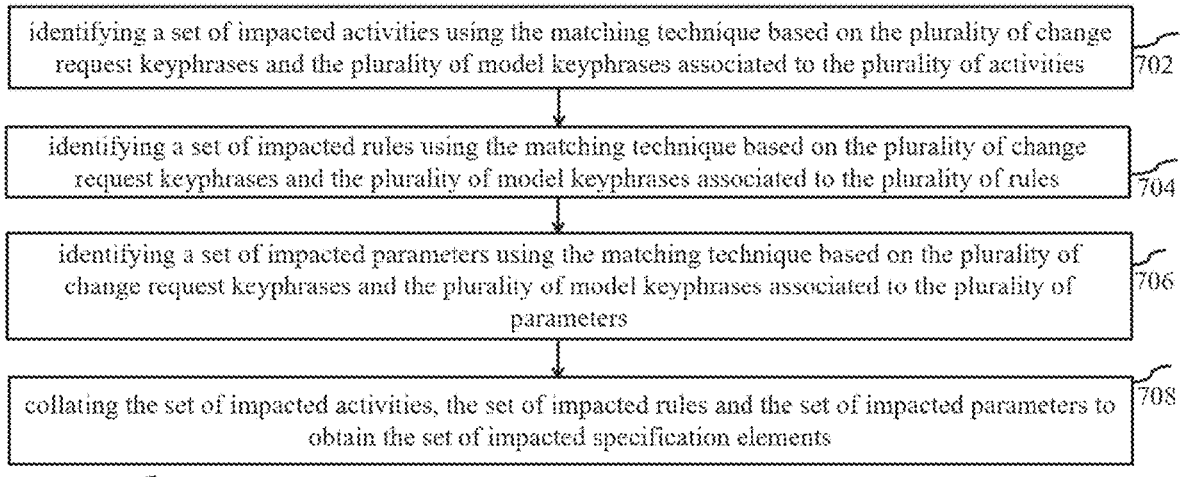
FIG. 7 is a flow diagram illustrating a method (700) for specification impact identification technique during generation of impact analysis specification document for a change request in accordance with some embodiments of the present disclosure.

In an embodiment, the set of impacted specification elements is identified based on the specification impact identification technique explained using method 700 of the FIG. 7 as explained below:

At step 702, a set of impacted activities is identified using the matching technique based on the plurality of change request keyphrases and the plurality of model keyphrases associated to the plurality of activities. In an embodiment, the matching technique includes a similarity score computation technique.

The similarity score computation technique includes finding a match score for each plurality of change request keyphrases with each activity keyphrases. Further, a best match is found for each plurality of change request keyphrases and sum their match scores to get the similarity score.

Figure 8:
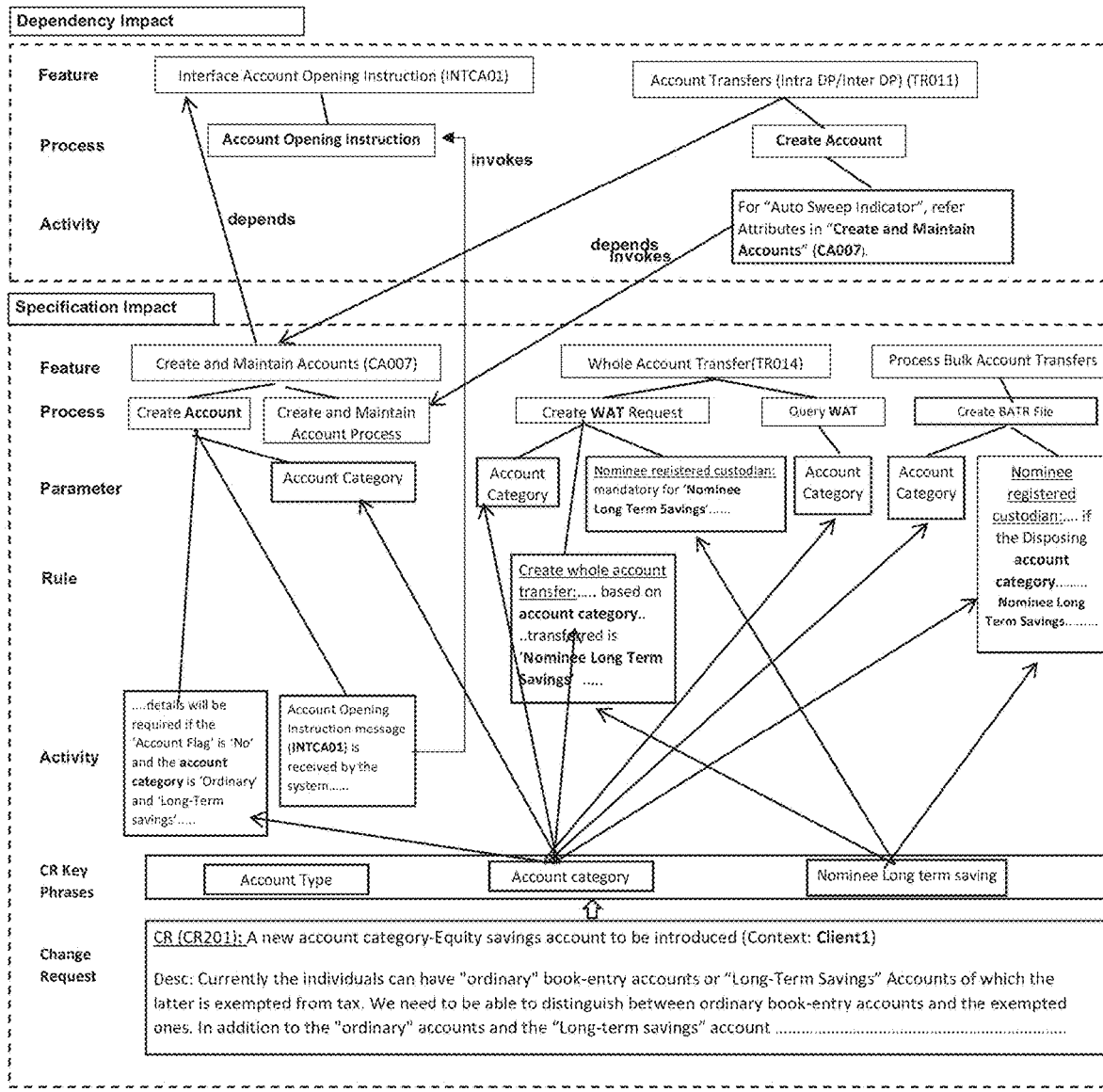
FIG. 8 illustrates an example scenario for feature impact identification technique and the specification impact identification technique during generation of impact analysis specification document for a change request in accordance with some embodiments of the present disclosure

In an example scenario, the process of identifying the set of impacted activities, the set of impacted rules and the set of impacted parameters to obtain the set of impacted specification elements is illustrated using the FIG. 8, wherein for the CR given, a few of the plurality of key phases extracted include: (a) "account category" and (b) "nominee long term saving". An example scenario of set of impacted activities identified for keyphrases is listed below:

TABLE 2

Set of impacted activities

| Keyphrases | The set of impacted activities |
|---|---|
| Account category | Feature CA007 (Create and Maintain Account), the Process "Create account" has a matching Activity -" . . . details will be required if the 'Account Flag' is 'No' and the account category is 'Ordinary' and 'Long-Term savings" |

At step 704, a set of impacted rules is identified using the matching technique based on the plurality of change request keyphrases and the plurality of model keyphrases associated to the plurality of rules.

In an embodiment, the matching technique includes a similarity score computation technique.

The similarity score computation technique includes finding a match score for each plurality of change request keyphrases with each rule keyphrase. Further, a best match is found for each plurality of change request keyphrases and sum their match scores to get the similarity score.

An example scenario of set of impacted rules identified for keyphrases is listed below:

TABLE 3

Set of impacted rules

| Keyphrases | The set of impacted rules |
| --- | --- |
| Account category, Nominee Long Term Savings | Feature TR014 (Whole Account Transfer), Process "Create WAT request", Ruleset "Create whole account transfer" has a matching Rule "based on account category . . . transferred is 'Nominee Long Term Savings'". |

At step 706, a set of impacted parameters is identified using the matching technique based on the plurality of change request keyphrases and the plurality of model keyphrases associated to the plurality of parameters.

In an embodiment, the matching technique includes a similarity score computation technique.

The similarity score computation technique includes finding a match score for each plurality of change request keyphrases with each parameter keyphrases. Further, a best match is found for each plurality of change request keyphrases and sum their match scores to get the similarity score.

An example scenario of set of impacted parameters identified for keyphrases is listed below:

TABLE 4

Set of impacted parameters

| Keyphrases | The set of impacted parameters |
| --- | --- |
| Account category | Feature CA007, Process "Create account" has a matching Parameter - "account category" |
| | Feature TR014, Process "Create WAT request" has a matching Parameter - "account category" |
| | Feature TR014, Process "Query WAT" has a matching Parameter - "account category" |
| | Feature TR015, Process "Create BATR file" has a matching Parameter - "account category |
| Nominee long term saving | Feature TR015, Process "Create BATR File "has a matching Parameter "Nominee registered custodian: If the Disposing account category, Nominee Long Term Savings. |

At step 708, the set of impacted activities, the set of impacted rules and the set of impacted parameters is collated to obtain the set of impacted specification elements.

The example scenario of set of impacted activities, the set of impacted rules and the set of impacted parameters identified is listed below:

TABLE 5

An example scenario of the set of impacted activities, the set of impacted rules and the set of impacted parameters.

| Impacted Feature | Impacted Process | Impacted Activity | Impacted Rule | Impacted Parameter |
|---|---|---|---|---|
| CA007 Create and maintain accounts | Create account | Details will be required if the 'Account Flag' is 'No' and the account category is 'Ordinary' and 'Long-Term savings' . . . | | Account Category |
| TR014 Whole Account Transfer | Create WAT Request | | Create whole account transfer: . . . based on account category . . . transferred is 'Nominee Long Term Savings | Account Category, Nominee registered custodian |
| TR015 Process Bulk Account Transfers | Query WAT Create BATR file | | | Account Category Account Category, Nominee registered custodian |

In an embodiment, the set of impacted processes is identified based on the plurality of processes and the set of the impacted specification elements. The impacted processes are identified by navigating through the associations of impacted specification element to the process as shown using the contextual specification model.

Figure 9:
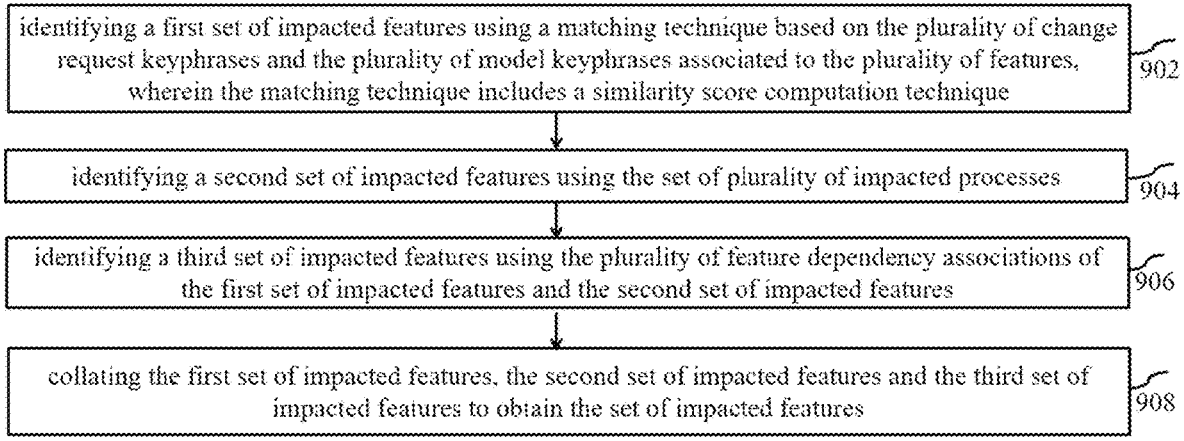
FIG. 9 is a flow diagram illustrating a method (900) for feature impact identification technique during generation of impact analysis specification document for a change request in accordance with some embodiments of the present disclosure.

In an embodiment, a set of impacted features using the feature impact identification technique explained using method 900 of the FIG. 9 as explained below:

At the step 902, a first set of impacted features is identifying using a matching technique. The first set of impacted features is identifying based on the plurality of change request keyphrases and the plurality of model keyphrases associated to the plurality of features.

In an embodiment, the matching technique includes a similarity score computation technique. The similarity score computation technique includes finding a match score for each plurality of change request keyphrases with each plurality of feature keyphrases. Further, a best match is found for each plurality of change request keyphrases and feature keyphrases. If the match score is more than a threshold value, sum of the match scores is computed to get the similarity score.

At the step 904, a second set of impacted features is identified using the set of plurality of impacted processes.

The second set of impacted features are identified by navigating through the associations of impacted processes to the features as shown using the contextual specification model. In an example scenario, considering the FIG. 8 the three feature (a) create and maintain accounts (CA007) (b) whole account transfer (TR014) and (c) process bulk account transfers (TR015) are identified as impacted features due to the association with impacted processes.

At the step 906, a third set of impacted features is identified using the plurality of feature dependency associations of the first set of impacted features and the second set of impacted features.

There are dependency associations among features as an activity/rule/parameter may invoke another activity/rule/parameter for its computation. For example, an interface file may be received/generated from another process creating a "depends" association between the features. A change in one of the features may result in impact of the feature which has "depends" association with it. In such cases, the features having "depends" association with impacted features are also added as third set of impacted features.

In an example scenario, considering the FIG. 8, the interface account opening instruction (INTCA01) and account Transfers (Intra DP/inter DP) (TR011) are identified as impacted features due to its dependency association with feature create and maintain account (CA007). The feature CA007 process "Create account" has activity "Account Opening Instruction message (INTCA01) is received by the system . . . " that invokes "account opening instruction process" of INTCA01 creating a depends on association between features CA007 and INTCA01. Similarly, the TR011 process" create account transfer" activity "For "Auto Sweep Indicator", refer Attributes in "Create and Maintain Accounts" (CA007) "invokes process "create and maintain account" process of CA007 creating a depends association between features TR011 and CA0017.

At the step 908, collating the first set of impacted features, the second set of impacted features and the third set of impacted features to obtain the set of impacted features.

In an embodiment, the list of features are collated along with the type of impact whether specification impact or dependency impact is listed below:

TABLE 6

Set of impacted features

| Impacted Feature | Impact type |
|---|---|
| CA007 Create and maintain accounts | Specification Impact |
| TR014 Whole Account Transfer | Specification Impact |
| TR015 Process Bulk Account Transfers | Specification Impact |
| INTCA01 Interface Account Opening Instruction | Dependency Impact |
| TR011 Account Transfers (Intra DP/Inter DP) | Dependency Impact |

At step 312 of the method 300, an impact analysis specification document is generated based on the fine-grained impact analysis in the impact analysis specification document generator 212. The impact analysis specification document is generated using an impact analysis specification document generation technique.

The impact analysis specification document generation technique comprises generating a formatted rich text impact analysis document using the set of impacted features, the set of impacted processes, and the set of impacted specification elements based on a set of grouping techniques and a document engine technique.

Figure 10:
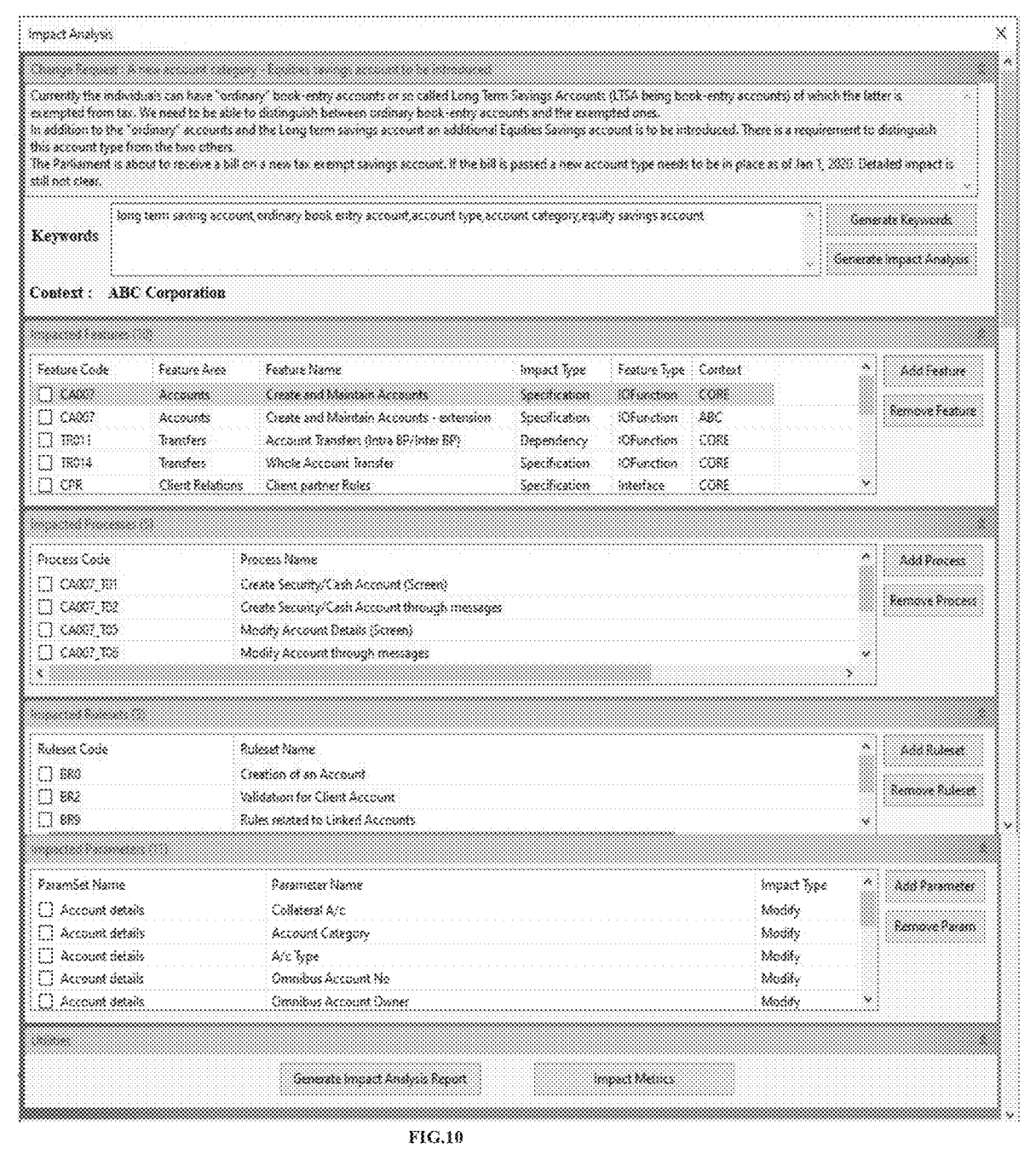

FIG. 10 shows an example implementation of change request impact analysis. The example shows the change request along with the identified key phrases. The FIG. 10 also displays the generated "set of impacted features", the "set of impacted processes", the "set of impacted ruleset" and the "set of impacted parameters" for the given CR and the identified key phrases. Based on the identified key phrases, the generated set of impacted features, the set of impacted processes, the set of impacted ruleset and the set of impacted parameters—the impact analysis specification document is generated.

In an embodiment, the impact analysis specification document is generated based on the fine-grained impact analysis, wherein the impact analysis specification document is generated in several steps as shared below:

The fine-grained impact analysis generates the set of impacted features, the set of impacted processes, and the set of impacted specification elements which is used for generating the impact analysis specification document. The set of impacted features, the set of impacted processes, and the set of impacted specification elements are is received and processed/grouped in several steps as shared below to generate the impact analysis specification document.

The set of impacted features are grouped based on the plurality of feature types, and the feature hierarchy. The set of impacted processes are grouped for each feature from the set of impacted features. The set of impacted specification elements are grouped for each processes from the set of impacted processes.

A formatted rich text impact analysis document is generated based on the grouped set of impacted features, the grouped set of impacted processes and the grouped set of impacted specification elements using a document engine technique In an embodiment, the formatted rich text impact analysis document is generated using a document engine text generation technique wherein the. text generation techniques include a table generation, a styled paragraph generation, and more similar techniques for creating any document.

FIG. 11 illustrate an example scenario for the impact analysis specification report. The formatted rich text impact analysis document is an elaborate document containing the fine-grained impact analysis that has several sections comprising impact summary, impact features, impacted interfaces and impacted reports. The example scenario has captured limited information for example purposes, however the formatted rich text impact analysis document is usually comprising exhaustive details covering several impacts and details.

The plurality of impact associations is updated corresponding to the CR and each of the plurality of impacted features, each of the plurality impacted processes, each of the plurality of impacted specification elements in the contextual specification model.

Experiments

Experiments have been conducted using the disclosed techniques of generation of impact analysis specification document for a change request. Several change requests (CR-1 to CR-5) have been considered for experimental purposes and the impact of the CRs have been analyzed using the disclosed techniques of fine-grained impact analysis and generation of impact analysis specification document for a change request. The automatically generated impacted parameters, impacted rules and the impacted processes and the impacted features for each CR have been tabulated in the table below:

TABLE 7

Impact analysis of a CR-1 to CR-5.

| | Impacted Parameters | Impacted Rules | Impacted Processes | Impacted Features |
|---|---|---|---|---|
| CR-1 | 21 | 8 | 29 | 19 |
| CR-2 | 3 | 1 | 3 | 3 |
| CR-3 | 13 | 1 | 10 | 11 |
| CR-4 | 1 | 1 | 4 | 4 |
| CR-5 | 0 | 1 | 3 | 3 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

This disclosure relates generally to impact analysis and, more particularly, to generation of impact analysis specification document for a change request. The existing state-of-art techniques for impact analysis for a change request are mostly manual, and further most of the research on impact analysis is based on source code analysis and does not address the impact of the CR at multi-granular levels. The disclosed techniques perform a fine-grained impact analysis of the CR at multi-granular levels. The fine-grained impact analysis at multi-granular includes identifying a set of impacted specification elements, a set of impacted processes, and a set of impacted features based on several steps including generating a contextual specification model and extracting a plurality of keyphrases.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
   receiving a plurality of inputs from a plurality of sources, via one or more hardware processors, wherein the plurality of inputs is associated with a change request and the plurality of inputs comprises:
      a change request, where the change request comprises a change title, a change description and a change context, wherein the change context is at least one of a client, a market and a geography in which the change request is to be implemented, and
      a plurality of natural language requirement specification documents;
   pre-processing the change request to obtain a processed change request based on a set of pre-processing techniques, via the one or more hardware processors, wherein the processed change request comprises a processed change title, a processed change description and a processed change context, wherein the set of pre-processing techniques is performed using a domain dictionary and includes at least one of a technique for removal of a plurality of stop words, a technique for a root word formation, a technique for swapping dictionary terms with corresponding common names;
   generating a contextual specification model, via the one or more hardware processors, based on the plurality of natural language requirement specification documents and the processed change context, using a model generation technique, wherein the contextual specification model comprises:
      the plurality of features, where the plurality of features is decomposed into multiple levels as per a feature hierarchy and each of the plurality of features is associated with a plurality of feature types, a plurality of feature dependency associations, and a plurality of feature extensions corresponding to the change context, wherein the plurality of feature types comprises an Input/Output function, a query, a report and an interface, wherein depending on the feature type, associated feature properties change, wherein features of the interface feature type includes properties on a source system, a target system, direction, schedule, a field specifications, and features of the report feature type includes frequency of distribution, file format, language, schedule, wherein the plurality of features are associated with a context type that determines whether the feature is applicable in an implementation, and wherein the plurality of features are extended for a specific context;
      a plurality of processes corresponding to the plurality of features, and
      a plurality of specification elements corresponding to the plurality of processes, wherein the plurality of specification elements comprises a plurality of activities, a plurality of rulesets, a plurality of rules and a plurality of parameters;
   extracting a plurality of keyphrases using a set of keyphrase extraction techniques, via the one or more hardware processors, based on the processed change title, the processed change description, and contextual specification model wherein the plurality of keyphrases comprises a plurality of change request keyphrases and a plurality of model keyphrases;
   performing a fine-grained impact analysis for the change request at multi-granular levels, via the one or more hardware processors, using the contextual specification model and the plurality of change request keyphrases, and the plurality of model keyphrases wherein the fine-grained impact analysis comprises:
      identifying a set of impacted specification elements based on the plurality of specification elements, the plurality of change request keyphrases, and the plurality of model keyphrases using a specification impact identification technique;
      identifying a set of impacted processes based on the plurality of processes and the set of the impacted specification elements, wherein the set of impacted processes are identified by navigating through associations of the impacted specification element to the process using the contextual specification model; and
      identifying a set of impacted features based on a plurality of features, the set of impacted processes, the plurality of change request keyphrases, and the plurality of model keyphrases using a feature impact identification technique;
   generating an impact analysis specification document based on the fine-grained impact analysis, via the one or more hardware processors, using an impact analysis specification document generation technique, wherein the impact analysis specification document generation technique comprises generating a formatted rich text impact analysis document using a grouped set of impacted features, a grouped set of impacted processes, and a grouped set of impacted specification elements based on a set of grouping techniques and a document engine text generation technique, wherein the set of impacted features are grouped based on the plurality of feature types, and the feature hierarchy, the set of impacted processes are grouped for each feature from the set of impacted features and the set of impacted specification elements are grouped for each processes from the set of impacted processes, wherein the document engine text generation technique includes a table generation, a styled paragraph generation for creating a document, wherein the formatted rich text impact analysis document is an elaborate document containing the fine-grained impact analysis including a plurality of sections comprising an impact summary, impacted features, impacted interfaces and impacted reports, wherein a plurality of impact associations is updated corresponding to the change request and each of the set of impacted features, each of the set of impacted processes, each of the set of impacted specification elements in the contextual specification model; and displaying the set of impacted features, the set of impacted processes, the set of impacted specification elements for the change request and the identified keyphrases.

2. The method of claim 1, wherein the model generation technique comprises of a Natural language processing (NLP) technique.

3. The method of claim 1, wherein the keyphrases extraction technique comprises of a Natural language processing (NLP) based techniques including a term frequency-inverse document frequency (TF-IDF) technique, a Rapid Automatic Keyword Extraction (RAKE) technique and a pattern-chunking technique, wherein the pattern-chunking technique comprises identifying keyword using tokenization, parts of speech (PoS) tagging, text conversion to root form, excluding stop words, and extracting keyphrases from a text element, wherein the text element is a CR or a feature, or a process, or a specification element, or a context type, wherein the identified keyphrases are refined using the TF-IDF technique, wherein each text element and the corresponding generated key phrases are identified and stored in a comma-separated values file.

4. The method of claim 1, wherein the specification impact identification technique comprises:

identifying a set of impacted activities using the matching technique based on the plurality of change request keyphrases and the plurality of model keyphrases associated to the plurality of activities;

identifying a set of impacted rules using the matching technique based on the plurality of change request keyphrases and the plurality of model keyphrases associated to the plurality of rules;

identifying a set of impacted parameters using the matching technique based on the plurality of change request keyphrases and the plurality of model keyphrases associated to the plurality of parameters; and collating the set of impacted activities, the set of impacted rules and the set of impacted parameters to obtain the set of impacted specification elements.

5. The method of claim 1, wherein the feature impact identification technique comprises:

identifying a first set of impacted features using a matching technique based on the plurality of change request keyphrases and the plurality of model keyphrases associated to the plurality of features, wherein the matching technique includes a similarity score computation technique, wherein the similarity score computation technique includes finding a match score for each plurality of change request keyphrases with each plurality of feature keyphrases, wherein when the match score is more than a threshold value, sum of match scores is computed to obtain a similarity score;

identifying a second set of impacted features using the set of plurality of impacted processes, wherein the second set of impacted features are identified by navigating through associations of impacted processes to the features using the contextual specification model;

identifying a third set of impacted features using the plurality of feature dependency associations of the first set of impacted features and the second set of impacted features; and collating the first set of impacted features, the second set of impacted features and the third set of impacted features to obtain the set of impacted features, wherein the first set of impacted features, the second set of impacted features and the third set of impacted features are collated with a type of impact including a specification impact and a dependency impact.

6. A system, comprising:

a memory storing instructions;

one or more communication interfaces; and one or more hardware processors coupled to the memory via the one or more communication interfaces, wherein the one or more hardware processors are configured by the instructions to:

receive a plurality of inputs from a plurality of sources, via one or more hardware processors, wherein the plurality of inputs is associated with a change request and the plurality of inputs comprises:

a change request, where the change request comprises a change title, a change description and a change context, wherein the change context is at least one of a client, a market and a geography in which the change request is to be implemented, and a plurality of natural language requirement specification documents;

pre-process the change request to obtain a processed change request based on a set of pre-processing techniques, via the one or more hardware processors, wherein the processed change request comprises a processed change title, a processed change description and a processed change context, wherein the set of pre-processing techniques is performed using a domain dictionary and includes at least one of a technique for removal of a plurality of stop words, a technique for a root word formation, a technique for swapping dictionary terms with corresponding common names;

generate a contextual specification model, via the one or more hardware processors, based on the plurality of natural language requirement specification documents and the processed change context, using a model generation technique, wherein the contextual specification model comprises:

the plurality of features, where the plurality of features is decomposed into multiple levels as per a feature hierarchy and each of the plurality of features is associated with a plurality of feature types, a plurality of feature dependency associations, and a plurality of feature extensions corresponding to the change context, wherein the plurality of feature types comprises an Input/Output function, a query, a report and an interface, wherein depending on the feature type, associated feature properties change, wherein features of the interface feature type includes properties on a source system, a target system, direction, schedule, a field specifications, and features of the report feature type includes frequency of distribution, file format, language, schedule, wherein the plurality of features are associated with a context type that determines whether the feature is applicable in an implementation, and wherein the plurality of features are extended for a specific context; and a plurality of processes corresponding to the plurality of features, and a plurality of specification elements corresponding to the plurality of processes, wherein the plurality of specification elements comprises a plurality of activities, a plurality of rulesets, a plurality of rules and a plurality of parameters;

extract a plurality of keyphrases using a set of keyphrase extraction techniques, via the one or more hardware processors, based on the processed change title, the processed change description, and contextual specification model wherein the plurality of keyphrases comprises a plurality of change request keyphrases and a plurality of model keyphrases;

perform a fine-grained impact analysis for the change request at multi-granular levels, via the one or more hardware processors, using the contextual specification model and the plurality of change request keyphrases, and the plurality of model keyphrases wherein the fine-grained impact analysis comprises:

identifying a set of impacted specification elements based on the plurality of specification elements, the plurality of change request keyphrases, and the plurality of model keyphrases using a specification impact identification technique;

identifying a set of impacted processes based on the plurality of processes and the set of the impacted specification elements, wherein the set of impacted processes are identified by navigating through associations of the impacted specification element to the process using the contextual specification model; and identifying a set of impacted features based on a plurality of features, the set of impacted processes, the plurality of change request keyphrases, and the plurality of model keyphrases using a feature impact identification technique;

generate an impact analysis specification document based on the fine-grained impact analysis, via the one or more hardware processors, using an impact analysis specification document generation technique, wherein the impact analysis specification document generation technique comprises generating a formatted rich text impact analysis document using a grouped set of impacted features, a grouped set of impacted processes, and a grouped set of impacted specification elements based on a set of grouping techniques and a document engine text generation technique, wherein the set of impacted features are grouped based on the plurality of feature types, and the feature hierarchy, the set of impacted processes are grouped for each feature from the set of impacted features and the set of impacted specification elements are grouped for each processes from the set of impacted processes, wherein the document engine text generation technique includes a table generation, a styled paragraph generation for creating a document, wherein the formatted rich text impact analysis document is an elaborate document containing the fine-grained impact analysis including a plurality of sections comprising an impact summary, impacted features, impacted interfaces and impacted reports, wherein a plurality of impact associations is updated corresponding to the change request and each of the set of impacted features, each of the set of impacted processes, each of the set of impacted specification elements in the contextual specification model; and display the set of impacted features, the set of impacted processes, the set of impacted specification elements for the change request and the identified keyphrases.

7. The system of claim 6, wherein the model generation technique comprises of a Natural language processing (NLP) technique.

8. The system of claim 6, wherein the keyphrases extraction technique comprises of a Natural language processing (NLP) based techniques including a term frequency-inverse document frequency (TF-IDF) technique, a Rapid Automatic Keyword Extraction (RAKE) technique and a pattern-chunking technique, wherein the pattern-chunking technique comprises identifying keyword using tokenization, parts of speech (PoS) tagging, text conversion to root form, excluding stop words, and extracting keyphrases from a text element, wherein the text element is a CR or a feature, or a process, or a specification element, or a context type, wherein the identified keyphrases are refined using the TF-IDF technique, wherein each text element and the corresponding generated key phrases are identified and stored in a comma-separated values file.

9. The system of claim 6, wherein the specification impact identification technique comprises:

identifying a set of impacted activities using the matching technique based on the plurality of change request keyphrases and the plurality of model keyphrases associated to the plurality of activities;

identifying a set of impacted rules using the matching technique based on the plurality of change request keyphrases and the plurality of model keyphrases associated to the plurality of rules;

identifying a set of impacted parameters using the matching technique based on the plurality of change request keyphrases and the plurality of model keyphrases associated to the plurality of parameters; and collating the set of impacted activities, the set of impacted rules and the set of impacted parameters to obtain the set of impacted specification elements.

10. The system of claim 6, wherein the feature impact identification technique comprises:

identifying a first set of impacted features using a matching technique based on the plurality of change request keyphrases and the plurality of model keyphrases associated to the plurality of features, wherein the matching technique includes a similarity score computation technique, wherein the similarity score computation technique includes finding a match score for each plurality of change request keyphrases with each plurality of feature keyphrases, wherein when the match score is more than a threshold value, sum of match scores is computed to obtain a similarity score;

identifying a second set of impacted features using the set of plurality of impacted processes, wherein the second set of impacted features are identified by navigating through associations of impacted processes to the features using the contextual specification model;

identifying a third set of impacted features using the plurality of feature dependency associations of the first set of impacted features and the second set of impacted features; and collating the first set of impacted features, the second set of impacted features and the third set of impacted features to obtain the set of impacted features, wherein the first set of impacted features, the second set of impacted features and the third set of impacted features are collated with a type of impact including a specification impact and a dependency impact.

11. One or more non-transitory machine-readable information storage mediums comprising one or more instructions which when executed by one or more hardware processors cause:

receiving a plurality of inputs from a plurality of sources, wherein the plurality of inputs is associated with a change request and the plurality of inputs comprises:
  a change request, where the change request comprises a change title, a change description and a change context, wherein the change context is at least one of a client, a market and a geography in which the change request is to be implemented, and
  a plurality of natural language requirement specification documents;

pre-processing the change request to obtain a processed change request based on a set of pre-processing techniques, wherein the processed change request comprises a processed change title, a processed change description and a processed change context, wherein the set of pre-processing techniques is performed using a domain dictionary and includes at least one of a technique for removal of a plurality of stop words, a technique for a root word formation, a technique for swapping dictionary terms with corresponding common names;

generating a contextual specification model, based on the plurality of natural language requirement specification documents and the processed change context, using a model generation technique, wherein the contextual specification model comprises:
  the plurality of features, where the plurality of features is decomposed into multiple levels as per a feature hierarchy and each of the plurality of features is associated with a plurality of feature types, a plurality of feature dependency associations, and a plurality of feature extensions corresponding to the change context, wherein the plurality of feature types comprises an Input/Output function, a query, a report and an interface, wherein depending on the feature type, associated feature properties change, wherein features of the interface feature type includes properties on a source system, a target system, direction, schedule, a field specifications, and features of the report feature type includes frequency of distribution, file format, language, schedule, wherein the plurality of features are associated with a context type that determines whether the feature is applicable in an implementation, and wherein the plurality of features are extended for a specific context;
  a plurality of processes corresponding to the plurality of features, and
  a plurality of specification elements corresponding to the plurality of processes, wherein the plurality of specification elements comprises a plurality of activities, a plurality of rulesets, a plurality of rules and a plurality of parameters;

extracting a plurality of keyphrases using a set of keyphrase extraction techniques, based on the processed change title, the processed change description, and contextual specification model wherein the plurality of keyphrases comprises a plurality of change request keyphrases and a plurality of model keyphrases;

performing a fine-grained impact analysis for the change request at multi-granular levels, using the contextual specification model and the plurality of change request keyphrases, and the plurality of model keyphrases wherein the fine-grained impact analysis comprises:
  identifying a set of impacted specification elements based on the plurality of specification elements, the plurality of change request keyphrases, and the plurality of model keyphrases using a specification impact identification technique;
  identifying a set of impacted processes based on the plurality of processes and the set of the impacted specification elements, wherein the set of impacted processes are identified by navigating through associations of the impacted specification element to the process using the contextual specification model; and
  identifying a set of impacted features based on a plurality of features, the set of impacted processes, the plurality of change request keyphrases, and the plurality of model keyphrases using a feature impact identification technique;

generating an impact analysis specification document based on the fine-grained impact analysis, using an impact analysis specification document generation technique, wherein the impact analysis specification document generation technique comprises generating a formatted rich text impact analysis document using a grouped set of impacted features, a grouped set of impacted processes, and a grouped set of impacted specification elements based on a set of grouping techniques and a document engine text generation technique, wherein the set of impacted features are grouped based on the plurality of feature types, and the feature hierarchy, the set of impacted processes are grouped for each feature from the set of impacted features and the set of impacted specification elements are grouped for each processes from the set of impacted processes, wherein the document engine text generation technique includes a table generation, a styled paragraph generation for creating a document, wherein the formatted rich text impact analysis document is an elaborate document containing the fine-grained impact analysis including a plurality of sections comprising an impact summary, impacted features, impacted interfaces and impacted reports, wherein a plurality of impact associations is updated corresponding to the change request and each of the set of impacted features, each of the set of impacted processes, each of the set of impacted specification elements in the contextual specification model; and displaying the set of impacted features, the set of impacted processes, the set of impacted specification elements for the change request and the identified keyphrases.

12. The one or more non-transitory machine readable information storage mediums of claim 11, wherein the model generation technique comprises of a Natural language processing (NLP) technique.

13. The one or more non-transitory machine readable information storage mediums of claim 11, wherein the keyphrases extraction technique comprises of a Natural language processing (NLP) based techniques including a term frequency-inverse document frequency (TF-IDF) technique, a Rapid Automatic Keyword Extraction (RAKE) technique and a pattern-chunking technique, wherein the pattern-chunking technique comprises identifying keyword using tokenization, parts of speech (PoS) tagging, text conversion to root form, excluding stop words, and extracting keyphrases from a text element, wherein the text element is a CR or a feature, or a process, or a specification element, or a context type, wherein the identified keyphrases are refined using the TF-IDF technique, wherein each text element and the corresponding generated key phrases are identified and stored in a comma-separated values file.

14. The one or more non-transitory machine readable information storage mediums of claim 11, wherein the specification impact identification technique comprises:
    identifying a set of impacted activities using the matching technique based on the plurality of change request keyphrases and the plurality of model keyphrases associated to the plurality of activities;
    identifying a set of impacted rules using the matching technique based on the plurality of change request keyphrases and the plurality of model keyphrases associated to the plurality of rules;
    identifying a set of impacted parameters using the matching technique based on the plurality of change request keyphrases and the plurality of model keyphrases associated to the plurality of parameters; and
    collating the set of impacted activities, the set of impacted rules and the set of impacted parameters to obtain the set of impacted specification elements.

15. The one or more non-transitory machine readable information storage mediums of claim 11, wherein the feature impact identification technique comprises:
    identifying a first set of impacted features using a matching technique based on the plurality of change request keyphrases and the plurality of model keyphrases associated to the plurality of features, wherein the matching technique includes a similarity score computation technique, wherein the similarity score computation technique includes finding a match score for each plurality of change request keyphrases with each plurality of feature keyphrases, wherein when the match score is more than a threshold value, sum of match scores is computed to obtain a similarity score;
    identifying a second set of impacted features using the set of plurality of impacted processes, wherein the second set of impacted features are identified by navigating through associations of impacted processes to the features using the contextual specification model;
    identifying a third set of impacted features using the plurality of feature dependency associations of the first set of impacted features and the second set of impacted features; and
    collating the first set of impacted features, the second set of impacted features and the third set of impacted features to obtain the set of impacted features, wherein the first set of impacted features, the second set of impacted features and the third set of impacted features are collated with a type of impact including a specification impact and a dependency impact.

* * * * *